Nov. 27, 1956          C. F. ROBINSON ET AL          2,772,367
                          RECORDING SYSTEM
Filed Sept. 17, 1953                              2 Sheets-Sheet 1
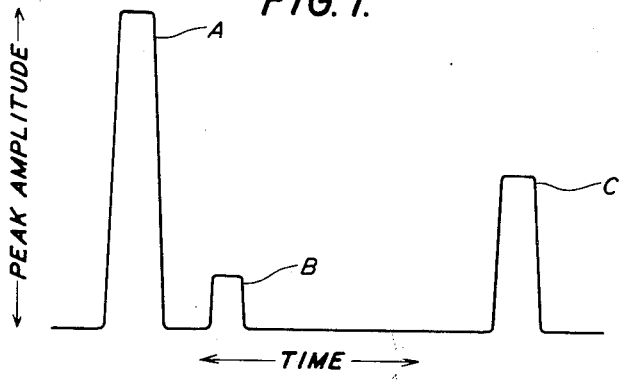
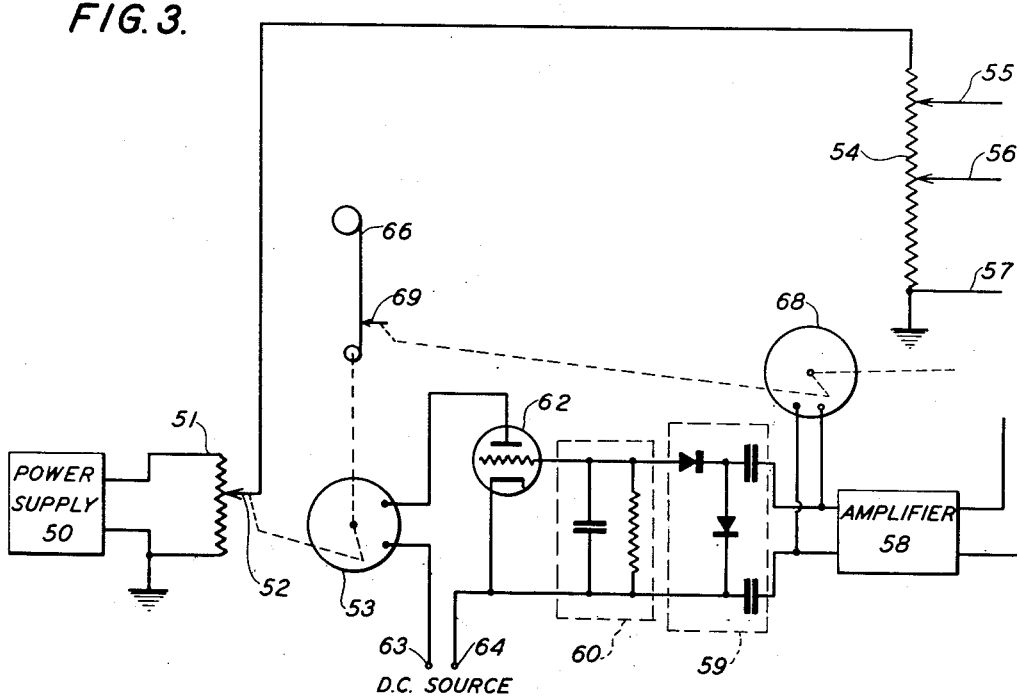
CHARLES F. ROBINSON
NORTON W. BELL
SALVATORE VITO PICCIRILLO
GEORGE D. PERKINS
                    INVENTORS
BY
                    ATTORNEY

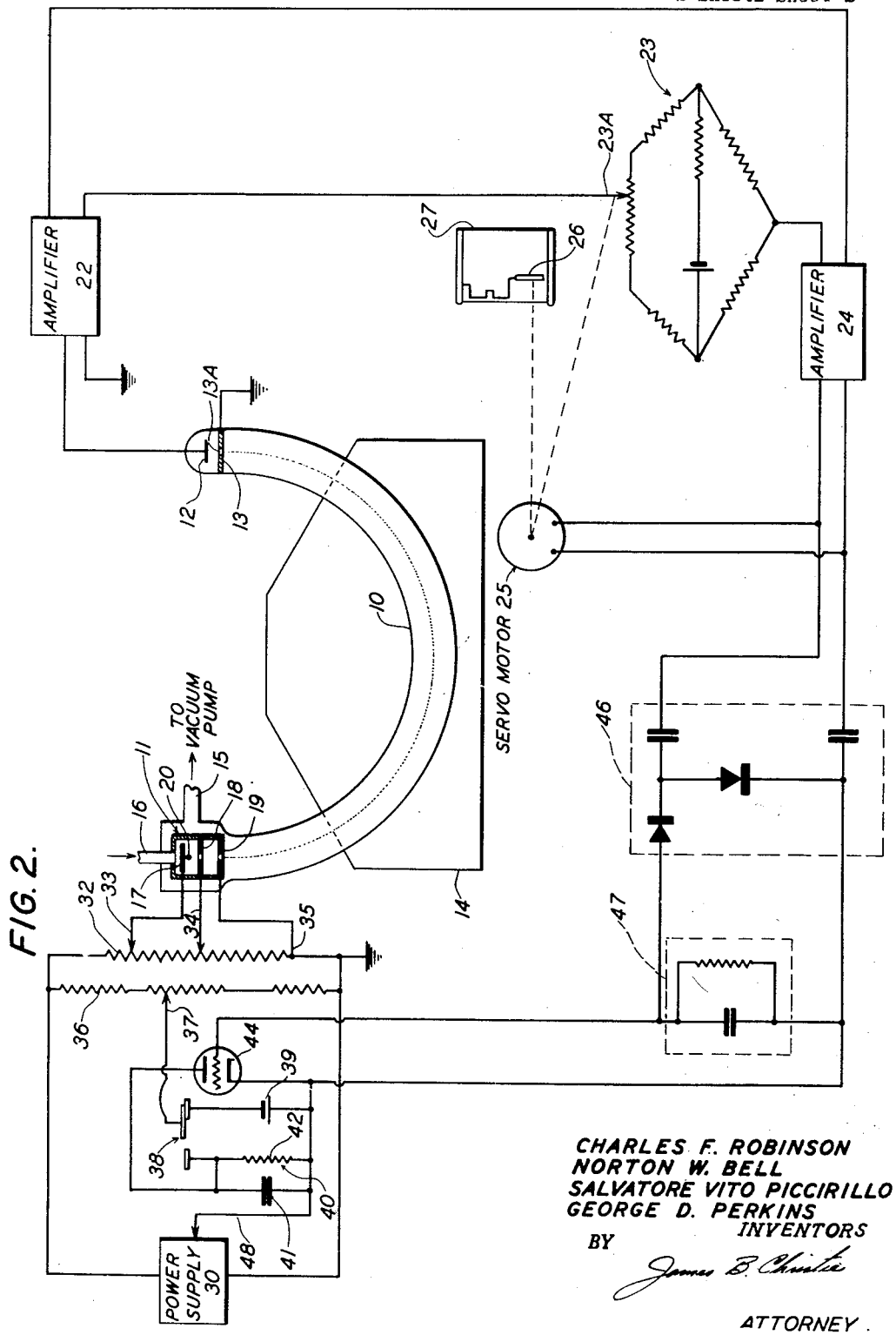

United States Patent Office 2,772,367
Patented Nov. 27, 1956

2,772,367

RECORDING SYSTEM

Charles F. Robinson, Pasadena, Norton W. Bell, Arcadia, Salvatore Vito Piccirillo, West Covina, and George D. Perkins, Duarte, Calif., assignors, by mesne assignments, to Consolidated Electrodynamics Corporation, Pasadena, Calif., a corporation of California Application September 17, 1953, Serial No. 380,784

12 Claims. (Cl. 250—41.9)

This invention relates to a recorder actuated control system operable to determine the rate of presentation of recordable information to a recorder as a function of the limiting recording rate under predetermined requirements of recording accuracy.

The apparatus of the invention finds application under any circumstances where the information to be recorded is subject to development and presentation to a self-balancing recorder at a controlled rate. A typical example of just such circumstances is in the field of mass spectrometry where the rate at which a mass spectrum is scanned is controllable by variation of the parameter effecting scan. As a consequence the recordable information, that is, the ion discharge current developed at the mass spectrometer collector electrode, may be presented for recording at a variable rate.

The need for the present apparatus is the result of the inherent limitation on the rate of pen travel in a conventional strip chart self-balancing recorder. The maximum permissible uniform scan rate of a mass spectrometer operating into such a recorder is limited by the pen travel time in recording the largest ion peak in the scanned spectrum, and further by the operating time of range changing mechanisms, if any. However, this maximum uniform rate is unnecessarily slow when only small ion peaks are being recorded or particularly in the intervals of recorder balance as between adjacent ion peaks.

The invention contemplates in combination with a self-balancing recorder, apparatus for varying the rate of presentation of information to the recorder comprising first means operable at a variable rate to develop the information, and second means connected between the recorder and the first means to continuously control the rate of operation of the first means as an inverse function of the magnitude of the recorder unbalance.

As applied to mass spectrometry, the above described apparatus consists of means operable to vary the rate of change of potential on the mass spectrometer focusing electrodes and an interconnection between this means and the output amplifier of the spectrometer self-balancing recorder, whereby to vary the rate of change of potential on the focusing electrodes as an inverse function of the magnitude of the output signal of the recorder amplifier.

More specifically, one conventional means of gradually varying the potential on mass spectrometer focusing electrodes, so as to scan a given spectrum across the spectrometer resolving slit, comprises a capacitor which, after charging, is allowed to decay across a voltage divider to which the respective focusing electrodes are connected. The potential variation across the divider as a consequence of the decay of the capacitor charge effectuates the desired continuous potential variation on the focusing electrodes.

In one embodiment of the invention means are connected between the output amplifier of the spectrometer recorder and the capacitor circuit to vary the rate of decay of the capacitor charge and hence vary the rate of spectrometer scan in the mass spectrometer.

Another frequently employed means of varying scanning potentials on mass spectrometer focusing electrodes comprises a motor driven variable potentiometer having a voltage source connected across it and the tap of which is connected through a conventional voltage divider to the respective focusing electrodes. In accordance with the present invention, means are supplied to control the operation of the potentiometer motor as an inverse function of the output of the recorder amplifier. As will become apparent this means has the added advantage of enabling simultaneous and commensurate variation in travel speed of the recorder strip chart whereby the record remains undistorted regardless of the extent and pattern of variations in scanning speed.

The invention will be clearly understood from the following detailed description taken in conjunction with the accompanying drawing in which:

Fig. 1 is a plot of an idealized record of a scan spectrum;

Fig. 2 is a schematic circuit diagram of a mass spectrometer provided with a control system in accordance with the invention; and Fig. 3 is a partial circuit diagram of an alternative scan control apparatus in accordance with the invention.

Referring to Fig. 1, the idealized recorded trace of a mass spectrum as illustrated includes ion peaks A, B and C. The maximum uniform scan rate of a spectrum of this type is determinable by the amplitude of the largest peak A and the pen travel time in traversing the peak. At this uniform rate an inordinate amount of time is involved in traversing the relatively smaller peak B and particularly in traversing the barren region between peaks B and C. It is just this situation, as explained relative to the spectrum trace of Fig. 1, which gives rise to the need for apparatus of the type herein disclosed. One such apparatus embodiment is illustrated diagrammatically in Fig. 2.

Referring to Fig. 2 a typical mass spectrometer is shown schematically as including an analyzer tube 10 having an ion source 11 disposed at one end and a collector electrode 12 disposed at the other end and shielded by a barrier electrode 13 which includes a so-called resolving slit 13A. The analyzer tube 10 is conventionally immersed in a transverse magnetic field established by means of oppositely located magnet pole pieces, one of which is identified by the reference character 14. The spectrometer tube is connected by conduit 15 to an evacuating system (not shown) and ionization chamber 11 is connected by a conduit 16 to a sample source (not shown).

The ionization chamber 11 may include the conventional repeller electrode 17 and focusing or accelerating electrodes 18, 19 and means (not shown) for developing an ionizing electron beam 20 traversing the chamber in the region between the repeller electrode and the first focusing electrode 18.

The collector electrode 12 is conventionally connected through an amplifier 22 to a self-balancing recorder bridge 23 through an input tap 23A, the bridge being connected in series between the output of amplifier 22 and a chopper type amplifier 24 which drives a servomotor 25. The motor functions to balance the bridge responsive to unbalance output of amplifier 24 by adjustment of tap 23A, and at the same time is connected to drive a pen 26 on a strip chart 27, the pen recording the excursions of input tap 23A of the bridge necessary to cause the bridge to balance the output of collector amplifier 22.

A mass spectrum is scanned in the mass spectrometer as illustrated by gradually varying the potentials applied to the repeller and accelerating electrodes so as to sweep the spectrum across the resolving slit 13A to successively focus different regions of the spectrum on the collector electrode 12. The rate of scan is therefore a function of the rate of change of the focusing potential on the ion source electrodes. Potential is supplied to the electrodes from a power supply 30 connected across a voltage divider 32 to which the ion source electrodes 17, 18 and 19 are tapped at 33, 34 and 35 respectively. The terminal accelerating electrode 19 may be at ground potential as illustrated. The power supply 30 is generally of the voltage regulated type and includes a voltage divider network 36 connected across its output leads from which a predetermined fractional voltage is tapped at 37 to be fed back into the power supply as a regulating voltage. In accordance with the present invention the tap 37 is connected to the power supply through a shorting switch 38 alternately through a battery 39 or through a decay network 40 comprising parallel coupled capacitor 41 and resistor 42. The upper contact of the switch 38 may be moved to contact either the left-hand or the right-hand lower contacts of the switch. The switch is a shorting type so that the upper contact bridges across both the lower contacts when it is moved from one of the lower contacts to the other. Thus, the switch 38 may be employed either to connect the battery 39 in the control circuit or to charge the condenser 41 and then connect the condenser 41 in the control circuit.

A vacuum tube 44 is connected across the capacitor 41, a grid of the tube 44 being connected to the output of recorder amplifier 24 through a rectifier network 46 and a filter 47. A lead 48 connects from the tap 37 through the described circuit to the power supply to feed back a signal controlling the power supply output voltage in a conventional manner. Tube 44 in effect shorts the capacitor, capacitor discharge and hence scan rate varying directly with the current through the tube 44. When the recorder is balanced the output of amplifier 24 is negligible and the voltage on the grid of tube 44 is at a minimum whereby the current through the tube and consequently the scan rate is at a maximum. As soon as any intelligence is presented to the recorder by the mass spectrometer the pen motor starts to drive in response to an A. C. signal from the amplifier 24. This same signal is rectified and impressed upon the grid of tube 44 to correspondingly reduce the current through the tube and hence the scan rate until the recorder is again in balance.

The device is rate sensitive and a wide range of scan rates can be achieved such that the scan rate will be slow enough to permit even a recorder of moderate speed to follow a signal with good fidelity but at the same time will minimize the time lag between presentation of consecutive signals to the recorder.

Amplifier 24 is, in the conventional recorder, a chopper-type amplifier. However, such is not necessary to the instant invention and both the amplifier 24 and servomotor 25 may be of D. C. type whereby rectifier 46 between the amplifier and the grid of tube 44 becomes unnecessary. Alternatively, if desired, the mass spectrometer may be operated with a modulated beam, in which case the above described bridge 23 and amplifiers 22 and 24 are operated on A. C. as will be obvious to one skilled in the art.

In operation the apparatus of Fig. 2 works as follows: With sample flowing in inlet line 16 and being ionized in the ionization chamber 11, capacitor 41 is charged by the battery 39 upon movement of the upper contact to the switch 38 from the right-hand to the left-hand lower contact of the switch. As soon as the switch 38 is thrown, capacitor 41 becomes a voltage reference element and begins to discharge at a rate dependent upon the current flow through tube 44 and resistor 42. Discharge of the capacitor varies the signal applied through line 48 to control the power supply output and hence varies the voltage across the divider 32. This in turn proportionately varies the potential on the focusing electrodes of the ion source causing the ion spectrum to sweep across resolving slit 13A so that successive ion masses in the spectrum are successively focused on the collector 12. As an ion mass, say as represented by the peak A in Fig. 1, is focused on the collector, the output of amplifier 22 will unbalance the recorder bridge 23 and to an appreciable extent. This unbalance signal amplified and delivered by the amplifier 24 drives servomotor 25 to adjust the bridge tap 23A so as to balance the recorder at the same time causing pen 26 to traverse chart 27 to give a record of the excursions of tap 23A.

At the commencement of the signal represented by the peak A a large unbalance is produced in the recording network represented by a large increase in the output of amplifier 24, which output is applied to the grid of tube 44 correspondingly reducing the current flow in the tube and retarding the discharge of capacitor 41. By this means the portion of the spectrum encompassing the ion mass A is scanned across the collector electrode at a relatively slow rate. At the top of the peak A, and where the recorder is at a balanced condition, current flow through tube 44 will increase and the top of the peak will be scanned at a greater rate which will automatically be slowed as the peak is extinguished, i. e. as the recorder is following the down slope of the peak. The scan rate will be similarly and proportionately adjusted throughout the succeeding portions of the spectrum.

An alternative embodiment of the invention is shown in partial schematic circuit diagram in Fig. 3. In this embodiment, as also illustrated with reference to its application to a mass spectrometer, a power supply 50 is connected across a potentiometer 51, the adjustable tap 52 of which is driven by a motor 53. The tapped off output of potentiometer 51 is connected across a voltage divider 54 by means of which potentials may be applied to spectrometer ion source electrodes through taps 55, 56, 57 as in the foregoing embodiment. Amplifier 58 corresponds to amplifier 24 in the embodiment of Fig. 2, the normally associated recorder bridge and collector amplifier not being illustrated in this figure. The output of amplifier 58 is connected through a rectifier 59 and filter 60 to the grid of a vacuum tube 62. A source of voltage (not shown) is connected through the vacuum tube 62 across motor 53 so that the rate of operation of the motor 53 is a function of the conductivity of tube 62. The motor 53 is connected to drive tap 52 of potentiometer 51 and is also connected to the paper drive of the recorder strip chart 66. As in the foregoing embodiment, the recorder amplifier 58 is connected to drive a servomotor 68 which operates to balance the bridge as above described and to drive a recorder pen 69 on the strip chart 66.

The linkage coupling the tap of the potentiometer and the motor may be of various types. Ordinarily the potentiometer 51 is a multi-turn type, and in such case the linkage may be a gear system. The potentiometer 51 may be a logarithmic type arranged so that the record will have a linear mass scale, regardless of the speed of the motor 53.

The embodiment of the invention illustrated in Fig. 3 has an advantage over the embodiment illustrated in Fig. 2 in the automatic control of recorder strip chart travel as a direct function of scan rate so that the recorded trace represents a true reproduction of the relative position of successive ion peaks. This facilitates interpretation of the record.

The invention has been described for purposes of convenience and clarity as incorporated in a mass spectrometer system. However, it is to be understood that the invention is applicable under any circumstances in which information or intelligence may be supplied to a self-balancing recorder of the null balance type at a controllable rate and provides means for effectuating such rate control as a function of the instantaneous maximum allowable recorder error for any given predetermined requirement of recording accuracy. Mass spectrometry constitutes one example of such a situation. Infrared spectrometry constitutes another example and innumerable other examples will be apparent to those familiar with the recording art.

We claim:

1. In combination with a self balancing recorder, apparatus for varying the rate of presentation of information to the recorder comprising first means operable at a variable rate to develop the information, and second means connected between the recorder and the first means to continuously control the operation of the first means to vary the rate of presentation as an inverse function of the magnitude of recorder unbalance.

2. In combination with a self-balancing recorder, apparatus for varying the rate of presentation of information to the recorder comprising first means operable at a variable rate to develop the information, and second means connected between the recorder and the first means to continuously control the rate of operation of the first means as an inverse function of the magnitude of recorder unbalance.

3. In combination with a self balancing recorder, apparatus for varying the rate of presentation of information to the recorder comprising electrically energized means for developing the information, regulating means operable to vary the magnitude of the electrical signal applied to the electrically energized means, and means connected between the recorder and regulating means to control the operation of the regulating means as a function of recorder unbalance.

4. In a mass spectrometer having accelerating electrodes, a source of potential connected to the accelerating electrodes, a collector electrode and a self balancing recorder connected to receive ion current developed at the collector, the combination comprising means for varying the potential applied from the source to the accelerating electrodes, and means connected between the recorder and said last named means to vary the rate of variation of the potential applied to the accelerating electrodes as an inverse function of the magnitude of recorder unbalance.

5. In a mass spectrometer having accelerating electrodes, a source of potential connected to the accelerating electrodes, a collector electrode and a self balancing recorder connected to receive ion current developed at the collector, the combination comprising means for varying the potential applied from the source to the accelerating electrodes, a vacuum tube in circuit with said last named means whereby said potential is varied as a function of the conductivity of the vacuum tube, and means connected between the recorder and the grid of the vacuum tube to apply the unbalance output signal of the recorder to the vacuum tube grid.

6. In a mass spectrometer having ion accelerating electrodes, a voltage divider connected to impress potentials on the electrodes, a regulated power supply connected across the voltage divider, feed back means connected between the voltage divider and the power supply to control the output signal of the power supply, a capacitor connected in the feed back means so that discharge of the capacitor determines the feed back voltage, a collector electrode, and a self balancing recorder connected to record the amplified output of the collector electrode, the combination comprising control means in circuit with the capacitor operable to determine the discharge rate thereof, and means connected between the recorder and the control means to vary its operation as a function of the magnitude of the recorder unbalance.

7. In a mass spectrometer having ion accelerating electrodes, a voltage divider connected to impress potentials on the electrodes, a regulated power supply connected across the voltage divider, feed back means connected between the voltage divider and the power supply to control the output signal of the power supply, a collector electrode, and a self balancing recorder connected to record the amplified output of the collector electrode, the combination comprising a parallel coupled capacitor and vacuum tube serially connected in the feed back means, means for charging the capacitor, and means connected between the recorder and the vacuum tube to vary the conductivity of the tube as a function of the magnitude of the recorder unbalance.

8. In a mass spectrometer having ion accelerating electrodes, a voltage divider connected to impress potentials on the electrodes, a regulated power supply connected across the voltage divider, feed back means connected between the voltage divider and the power supply to control the output signal of the power supply, a collector electrode, and a self balancing recorder connected to record the amplified output of the collector electrode, the combination comprising a parallel coupled capacitor, reference voltage source and vacuum tube connected serially in the feed back means, a shorting switch connected between the capacitor and reference voltage source, and means connected between the recorder and the vacuum tube to apply a signal to the grid of the tube proportional to the magnitude of the recorder unbalance.

9. In a mass spectrometer having ion accelerating electrodes, a potentiometer connected to impress potentials on the electrodes, a power supply connected across the potentiometer, a collector electrode, and a self balancing recorder connected to receive ion discharge signals developed at the collector, the combination comprising means connected between the recorder and the potentiometer to vary the setting of the potentiometer as a function of the magnitude of unbalance of the recorder.

10. In a mass spectrometer having ion accelerating electrodes, a potentiometer having an adjustable tap, the tap of the potentiometer being connected to impress potentials on the electrodes, a power supply connected across the potentiometer, a motor mechanically connected to drive the tap of the potentiometer, a collector electrode, and a self balancing recorder connected to receive ion discharge signals developed at the collector, the combination comprising means connected between the recorder and the motor to vary the speed of the motor as an inverse function of the magnitude of unbalance of the recorder.

11. In a mass spectrometer having ion accelerating electrodes, a potentiometer having an adjustable tap, the tap of the potentiometer being connected to impress potentials on the electrodes, a power supply connected across the potentiometer, a motor mechanically connected to drive the tap of the potentiometer, a collector electrode, and a self balancing recorder connected to receive ion discharge signals developed at the collector, the combination comprising an electrical circuit including a source of power and a serially connected vacuum tube connected to energize the motor, and means connected between the recorder and the grid of the vacuum tube to vary the conductivity of the tube as an inverse function of the magnitude of unbalance of the recorder.

12. In a mass spectrometer having ion accelerating electrodes, a potentiometer having an adjustable tap, the tap of the potentiometer being connected to impress potentials on the electrodes, a power supply connected across the potentiometer, a motor mechanically connected to drive the tap of the potentiometer, a collector electrode, and a self balancing strip chart recorder connected to receive ion discharge signals developed at the collector, the combination comprising an electrical circuit including a source of power and a serially connected vacuum tube connected to energize the motor, means connected between the recorder and the grid of the vacuum tube to vary the conductivity of the tube as an inverse function of the magnitude of unbalance of the recorder, and means connected between the motor and the recorder strip chart and operable to vary the rate of chart travel proportionately to the variation in tube conductivity.

No references cited.